April 16, 1940.  J. OAKLEY  2,197,057
DISPLAY APPARATUS
Filed April 3, 1939
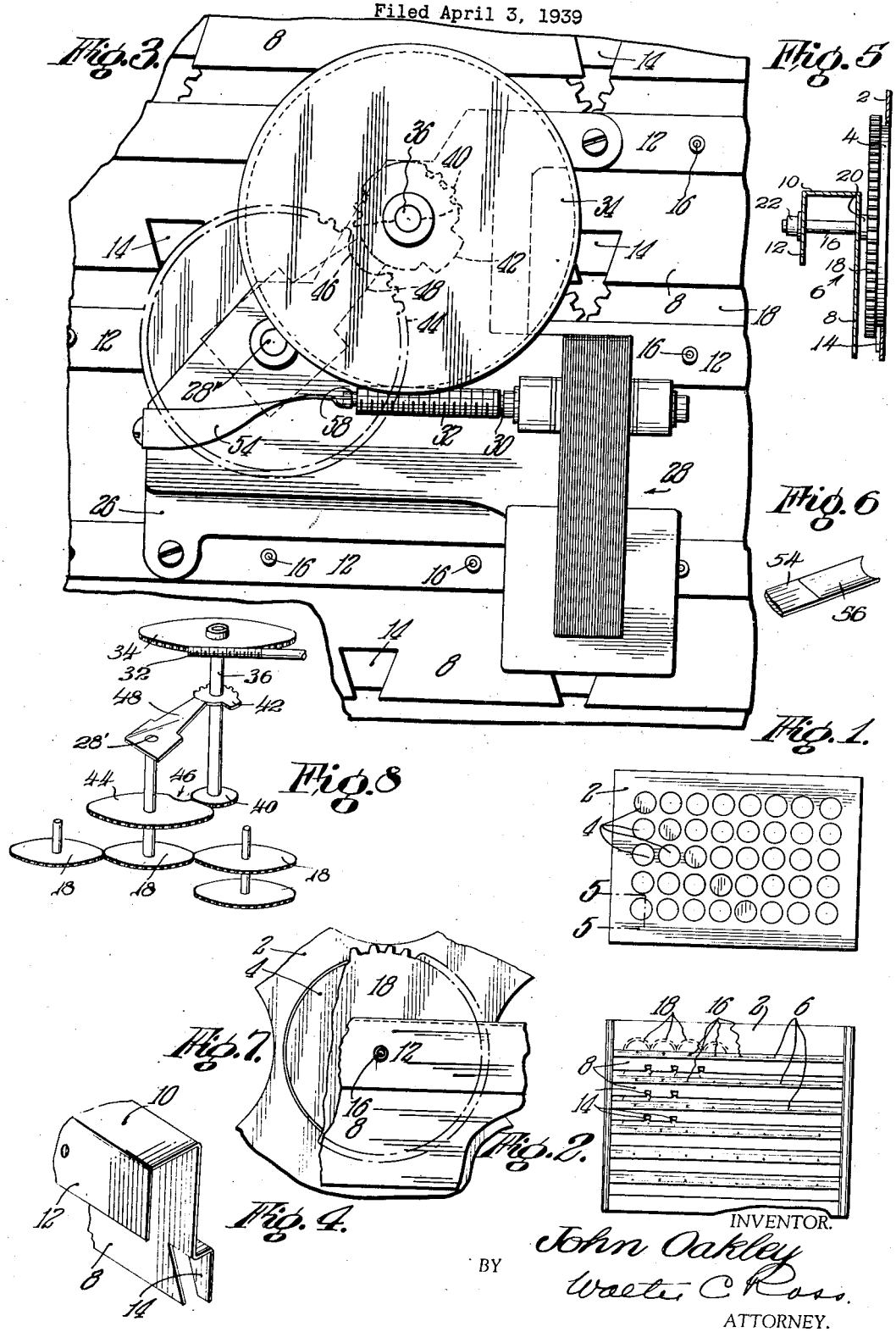
INVENTOR.
John Oakley
BY Walter C Ross.
ATTORNEY.

Patented Apr. 16, 1940

2,197,057

UNITED STATES PATENT OFFICE 2,197,057

DISPLAY APPARATUS

John Oakley, Springfield, Mass., assignor to Perkins Machine and Gear Company, West Springfield, Mass., a corporation of Massachusetts Application April 3, 1939, Serial No. 265,741

8 Claims. (Cl. 40—34)

This invention relates to improvements in display apparatus and is directed more particularly to improvements in display apparatus having a display surface with parts thereof arranged for movement as in the patent to Kennedy No. 1,743,017 of January 7, 1930.

The principal objects of this invention are directed to the provision of a display apparatus of the class referred to wherein novel operating means is provided for actuating the movable parts of the display surface.

Accordingly, there is provided an actuating or operating means which is simple in form and efficient in its operation so as to not only meet the demands of low cost construction but to meet the requirements of smoothness and quietness of operation. To that end, the novel operating mechanism consists of a few co-operating elements including interengaging members such as a worm and worm gear, the former of which is preferably rotated by a motor.

According to the invention, in order to compensate for wear of the parts and thereby insure the desired smoothness and efficiency of operation the worm is yieldingly urged into operative engagement with the worm gear by means of a flexible or yieldable member such as a spring. In this way the mechanism automatically compensates for wear should the same occur and smooth, quiet and positive operation so much desired is assured.

Display apparatus of the invention in order to meet the demand of low cost construction, rigidity and compactness, is constructed to have an outer display panel which has movable elements forming portions of the surface thereof and a plurality of inner supporting members which at spaced intervals are secured to the rear side of the panel and support the operating mechanism and the movable elements. These transverse members are formed in a novel manner to provide bearings for shafts with intermeshing gears between the panel and transverse members and said gears carry the movable portions or sections of the surface of the display apparatus.

Various other novel objects and advantages of the invention will be hereinafter more fully referred to in connection with the accompanying description of the present preferred form of the invention, with reference to the accompanying drawing, wherein:

Fig. 1 is a small scale front elevational view of the display apparatus embodying the novel features of the invention;

Fig. 2 is a rear elevational view of the apparatus shown in Fig. 1;

Fig. 3 is an enlarged rear elevational view of a portion of the display apparatus having the operating mechanism of the invention associated therewith;

Fig. 4 is a perspective fragmentary elevational view of a portion of one of the supporting members;

Fig. 5 is an enlarged sectional elevational view on the line 5—5 of Fig. 1;

Fig. 6 is an enlarged perspective view showing the end of the resilient member for urging the worm gear into engagement with the worm gear;

Fig. 7 is a fragmentary rear elevational view of the apparatus at an enlarged scale taken at the rear side thereof to explain certain features of such; and Fig. 8 is an exploded view showing in perspective the driving mechanism of the display apparatus shown in Fig. 3.

Referring now to the drawing more in detail, the invention will be fully described.

The apparatus on its forward side has a panel 2 which is provided with a plurality of spaced openings in which are disposed discs represented generally by 4. It will be understood that the discs are suitably supported for rotation in the openings so that they may be moved or rotated as will hereinafter more fully appear.

At the rear side of the display apparatus there is a supporting structure which may consist of a plurality of longitudinal extending supporting members 6. These supporting members 6 have forward plate portions 8, spacing portions 10, and journal portions 12 spaced from plates 8. Spaced lugs or ears 14 are formed along the lower edges of the plate 8 and these are arranged to be offset in planes spaced from and at the rear of the plate parts 8.

The lugs rest on the rear side of the panel 2 and are secured thereto in some suitable manner as by welding. The ears are arranged so as to bear on the panels 2 at points between the openings for the discs.

The members 6 are more or less U-shaped and secured to the plate 2 in such a way as to provide a space therebetween for gears and at the same time act to reinforce and strengthen the panel and co-operate therewith to provide a rigid and strong structure. The parts 8 and 12 of the longitudinal members 6 provide bearings for shafts 16. The shafts on their forward ends carry gears 18 which are in mesh with one another and on the gears the discs 4 previously referred to are carried.

There may be collars or other spacing means 20 between the gears 18 and plates 8 and other collars 22 on the shafts 16 to hold the shafts and gears against axial movement so that the discs are properly disposed in their respective openings.

The novel operating mechanism of the invention is shown in Fig. 3. A bracket or support 26 is suitably secured to one or more of the members 6 as shown and a motor represented by 28 is secured to the support.

A shaft 30 of the motor has a worm 32 thereon which is in mesh with a worm gear 34 fixed to a shaft 36, which, in turn, is journalled in the bracket. The worm has an outer free end and the construction is preferably such that slight movements of the worm are possible relative to the axis of gear 34.

A shaft 28' is journalled in the bracket 26 and functions as the driven shaft. This may be coupled or connected in any suitable manner to one of the gears 18 so that as said shaft 28' is rotated as desired, the various shafts 16 and discs 4 are rotated by means of gears 18. The adjacent gears 18 of a row are in meshing engagement and those of one row are in meshing engagement with adjacent gears of an adjacent row so that simultaneous rotation of all the gears 18 is made possible by rotation of any one of them.

A Geneva or other operative connection is associated with shafts 28' and 36. To that end a driving gear 40 is fixed to the shaft 36 as is a cam 42, and a driven gear 44 is fixed to shaft 28', certain teeth of which gear are cut away as at 46. Cam 42 has a peripheral part, as shown, which operates in conjunction with a keeper 48 on shaft 28'.

As shaft 36 is rotated keeper 48 is in engagement with the peripheral surface of cam 42 and shaft 28' is at rest until the cam 42 engages keeper 48 and moves it. When the keeper is moved, the teeth of gear 40 engage with the teeth of gear 44 and gear 44 is then rotated until keeper 48 again engages the peripheral part of cam 42.

Thus shaft 28' is intermittently rotated and thereby the discs 4 are rotated intermittently.

To eliminate lost motion and noise and to insure quietness and smoothness of operation while maintaining simplicity, the worm 32 is yieldingly held in engagement with the worm gear by means of a resilient member 54. This member may be in the form of a flat spring 54 secured at one end to the bracket 26, as shown, and which has its other end provided with a cup 56 in which a projection 58 of the worm 32 is seated. The parts are arranged in such a manner that the spring acts on the outer end of the worm and yieldingly urges the worm into meshing engagement with the worm gear thereby not only to provide smoothness of operation but to compensate for wear should any occur between the worm and worm gear.

While I have described the invention in great detail and with respect to the present preferred form thereof, it is not desired to be limited thereto since changes and modifications may be made therein without departing from the spirit and scope of the invention. The invention may be embodied in other specific forms without departing from the essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What it is desired to claim and secure by Letters Patent of the United States is:

1. The combination of display apparatus including a display surface having portions thereof adapted for relative movements with operating means therefor comprising, a motor having a shaft, a worm on said shaft having a free end, a worm gear engaging said worm, and a resilient member engaging said worm and urging the same into engagement with said worm gear.

2. The combination of display apparatus including a display surface having portions thereof adapted for relative movements with operating means therefor comprising, a support, a motor on said support having a shaft, a worm associated with said shaft having a free end, a worm gear rotatable relative to said support, and spring means on said support acting on said worm to urge said worm and gear into engagement.

3. The combination of display apparatus including a display surface having portions thereof adapted for relative movements with operating means therefor comprising, a support, a motor on said support having a shaft, a worm on said shaft having a free end provided with a projection, a worm gear rotatable relative to said support engageable with said worm, and a spring secured to said support provided with a seat in which said projection is receivable and adapted to maintain said worm and gear in operable relation.

4. A display apparatus comprising in combination, a front panel provided with a plurality of openings, a rear support structure including a plate and offset portions, the latter being secured to the rear face of the panel and spacing the former therefrom, shafts journalled in said supporting structure, intermeshing gears on shafts between the panel and supporting structure, and discs on said gears disposed in said openings.

5. A display apparatus comprising in combination, a front panel member provided with a plurality of openings, a rear supporting structure including plate, journal, and relatively offset members, the latter being secured to the rear face of the panel member and providing gear spaces between said plate and panel members, shafts journalled in said journal and plate members, intermeshing gears on said shafts in said gear spaces, and discs on said gears in said openings.

6. A display apparatus comprising in combination, a front panel member provided with a plurality of openings, supporting members at the rear of the panels including plate portions having offset parts secured to the rear face of the panel and spacing the plate portions therefrom, shafts journalled in said plate portions, intermeshing gears on said shafts in the spaces between the panel and plate portions, and discs associated with said gears disposed in said openings.

7. A display apparatus comprising in combination, a front panel provided with a plurality of openings, supporting members at the rear of the panel having plate and offset portions, the latter of which are secured to the rear face of said panel to provide spaces between said panel and plate portions and provided with journal portions spaced rearwardly of the plate portions, shafts journalled in said journal and plate portions, intermeshing gears on said shafts disposed in said spaces, and discs on said gears in said openings.

8. A display apparatus comprising in combination, a front panel provided with a plurality of openings, U-shaped supporting members at the rear of the panel formed to have plate, lug, and journal portions spaced from forward and rear sides thereof, the lug portions being secured to the rear face of the plate portion and providing spaces between the panel and plate portions, shafts journalled in said journal and plate portions, intermeshing gears in said spaces fixed to said shafts, and discs associated with said gears disposed in said openings.

JOHN OAKLEY.